Nov. 16, 1948.  E. P. RODEMANN  2,453,815
SELF-SYNCHRONOUS SYSTEM FOR REPRODUCING
MOTION OR POSITION
Filed Feb. 9, 1945
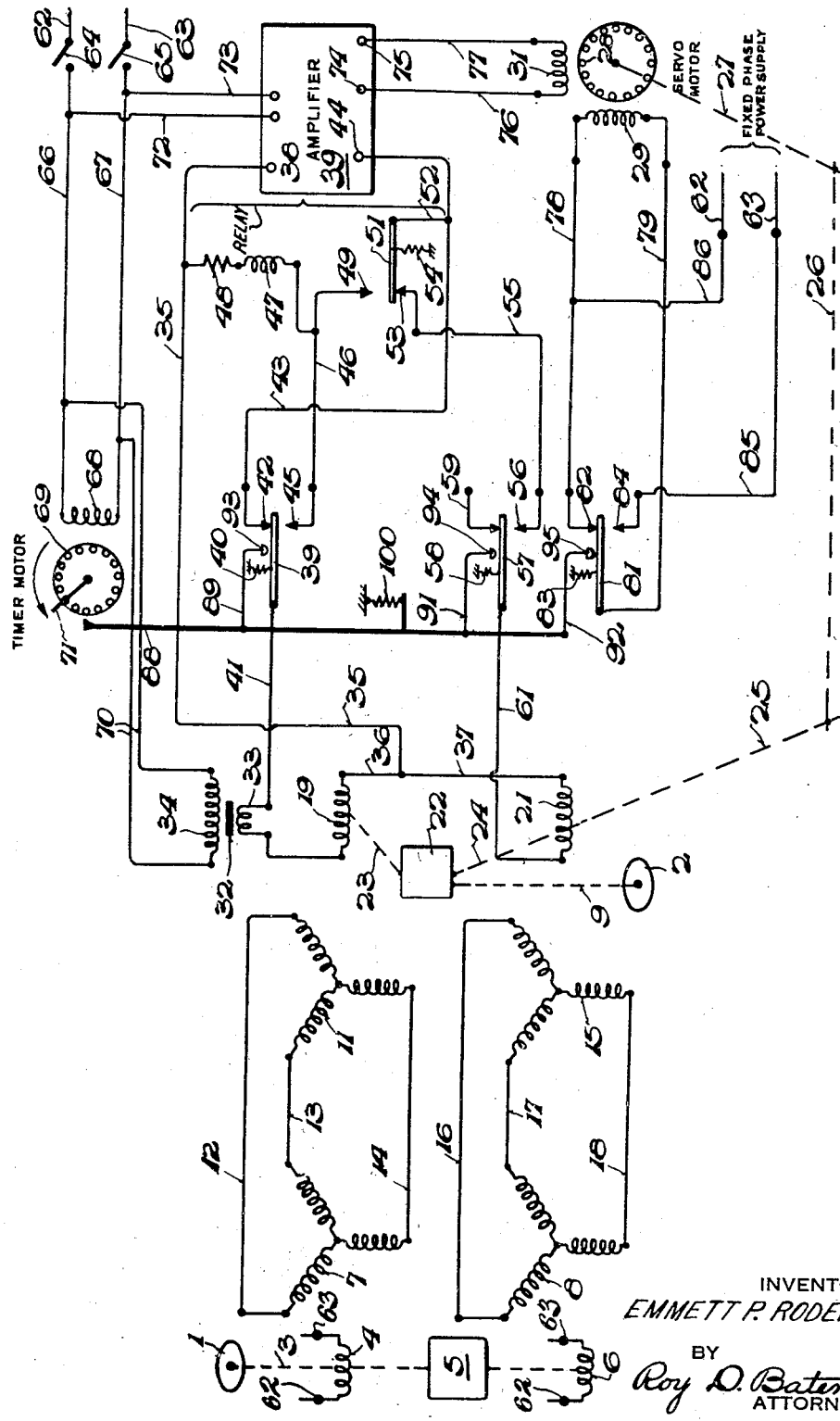
INVENTOR
*EMMETT P. RODEMANN*
BY
*Roy D. Bateman*
ATTORNEY Patented Nov. 16, 1948

2,453,815

UNITED STATES PATENT OFFICE 2,453,815

SELF-SYNCHRONOUS SYSTEM FOR REPRODUCING MOTION OR POSITION

Emmett P. Rodemann, Jamaica, N. Y., assignor to Bendix Aviation Corporation, Brooklyn, N. Y., a corporation of Delaware Application February 9, 1945, Serial No. 577,092

10 Claims. (Cl. 318—30)

1

The present invention relates to position reproducing apparatus of the character in which voltages developed in control transformers proportional to the departure of a driven member or follower from positional agreement with a driving member are transmitted to an amplifier which in turn control a servo motor to bring the parts into agreement.

It has been found that in apparatus of this character the servo motor will often tend to "run away" and drive the parts out of synchronism when the amplifier is initially energized. Also, where two intergeared driving members, of for instance the "one and thirty-six" speed type, are employed, and a relay automatically connects the amplifier to one or the other of the control transformers, depending upon the degree of departure from synchronism, the amplifier will frequently drive the parts into an ambiguous null, located approximately 180° from true position, when the amplifier is initially energized.

I have found that by employing special circuits, and utilizing a timer mechanism, energized simultaneously with energization of the amplifier, and normally placing the amplifier under control of the one speed transformer only, and maintaining one phase of the servo motor open, and causing the timer mechanism to first place the servo motor in operation a predetermined time after energizing the amplifier, after the latter has been sufficiently "warmed up" to exert proper control over the motor, and then, at a later time to again place the amplifier under the joint control of both transformers, an extremely accurate and efficient apparatus is produced, and one which will automatically prevent the servo motor from functioning until the amplifier has been warmed up sufficiently to assume full control, and which precludes driving of the parts into an ambiguous null position.

It is accordingly the major object of this invention to provide a novel position reproducing apparatus in which the servo motor is rendered inoperative until after the amplifier has been energized and has attained such condition that it can take over accurate control.

A further important object is to provide position reproducing apparatus of the so-called "vernier" type, with novel control means whereby the output of the one speed control transformer is fed to the amplifier when the latter is initially energized, and is automatically operable to place the output of the control transformers under the joint control of a relay after the amplifier has been energized and has been in operation a

2 sufficient length of time to assume proper control.

With reference to the drawing, the member whose motion it is desired to reproduce at a distance is illustrated as a disc 1, and the member which reproduces the motion has been illustrated as a disc 2. Disc 1 is connected by suitable shafting 3 to the rotor 4 of a self-synchronous transmitter motor, whose rotor or primary 4 is supplied with any suitable source of constant frequency alternating current, the source being indicated in the drawing as mains 62 and 63. Rotor 4 is drivingly connected to a speed multiplying mechanism 5, which in turn is drivingly connected to the rotor or primary 6 of a second self-synchronous transmitter motor, the speed ratio being such that rotor 6 will rotate 36 times for each revolution of rotor 4, although the exact ratio to be used will depend upon the application made of the invention, and the degree of "vernier" action desired. Primary 6 is energized by the same source of alternating current as primaries 4 and 6, namely, by mains 62 and 63.

The secondaries 7 and 8 of the "one" and "36" speed transmitter motors are Y connected to the primaries 11 and 15 respectively of a pair of control transformers by means of leads 12, 13, 14, 16, 17, and 18. It is well understood in the art that movement of transmitter primaries 4 and 6 will set up voltages in their secondaries 7 and 8 and in the primaries 11 and 15 of the control transformers. This in turn will develop voltages in the secondaries of the control transformers which are proportional to the departure from synchronism with respect to transmitter motor primaries 4 and 6. In the illustrated embodiment, 1 degree difference in the angular positions of the transmitter motor and control transformer primaries yields one volt. Signal displacement takes place over the entire range of movement of the transmitter motors and control transformers and is set up by the shift of the flux field in the stator windings of the control transformers, and the resulting displacement voltage, which has direction and magnitude, is fed into an amplifier, which in turn so controls the drive motor as to bring the parts into synchronism.

The one and 36 speed transformers have rotors 19 and 21 respectively, which are mechanically connected to a gear mechanism 22 by shafting indicated by the broken lines 23 and 24 respectively. Driven member 2 is also connected to the gear mechanism by a shaft 9. The speed reducing gearing is in turn connected by shafting 25, 26, and 27 to the rotor 28 of a squirrel cage induction motor having a fixed-phase winding 29 and a control phase winding 31. The fixed phase winding is automatically connected to and disconnected from the fixed-phase power supply mains 62 and 63, and the control phase 31 is connected to an amplifier, in the manner that will be hereinafter set forth.

The secondary 19 of the one speed transformer is connected in series with the secondary 33 of a displacement transformer having a core 32 and a primary 34, the latter being energized by the same source of fixed phase alternating current as the transmitter motors, from mains 62 and 63, in the manner to be later set forth. The voltage supplied in series with that of control transformer secondary 19 causes a signal displacement between secondaries 19 and 21 of 180° throughout the entire range of movement of their primaries, so that the signals from secondaries 19 and 21 do not pass through zero simultaneously except at zero degrees or exact positional agreement of the driving and driven members.

One side of secondaries 19 and 21 are connected to a common lead 35 by means of leads 36 and 37. Lead 35 is connected to the input terminal 38 of an amplifier 39, the latter being of any suitable well-known form. The other side of secondary 19 of the one speed transformer is connected to a switch member 39 by means of a lead 41, the switch being resiliently urged upwardly into engagement with a contact 42 by a tension spring 40. Contact 42 is connected by a lead 43 to amplifier input terminal 44. Switch 39 also coacts with a contact 45, which is connected by a lead 46 to the solenoid and resistance windings 47 and 48 and contact 49 of a relay 51. The relay comprises parts 47, 48, 49, 51, 53 and 54, these parts being bracketed in the drawing for the purpose of showing that they are parts of a relay which may be of any suitable type and of any desired make. Resistance 48 is connected to line 35, leading to input terminal 38 of the amplifier. Relay 51 is connected by a lead 52 to line 43 leading to amplifier input terminal 44. Switch member 51 also coacts with contact 53 and is normally urged into engagement with it by means of a tension spring 54. Contact 53 is connected by a lead 55 to the contact 56 of a switch 57, which has a spring 58 normally urging it into engagement with a stop or dead contact 59. Switch member 57 is connected by lead 61 to the opposite side of the 36 speed transformer secondary 21.

From the foregoing disclosure it is apparent that whenever relay 51 is disposed in its upper position in engagement with contact 49 the output from the 1 speed control transformer will be fed to input terminal 44 of the amplifier, and that when relay 51 is disposed in the lower position shown in the drawings, the output from the 36 speed control transformer will be fed into the amplifier input. It is also apparent that when relays 39 and 57 are disposed in their upper positions shown, the 36 speed transformer output is effectively out of the circuit, and that the output from the 1 speed transformer will be fed to amplifier input terminal 44, irrespective of the position of relay 51, by way of lead 41, contact 42, and lead 43.

Relay 51 in the position of the parts illustrated connects the secondary 21 of the thirty-six speed transformer to the amplifier, and it functions to automatically connect the secondary 19 of the one-speed transformer to the amplifier and to disconnect the thirty-six speed transformer, by relay 51 lifting into engagement with contact 49, wherever the driven member 2, departs more than a predetermined amount from positional agreement with driving member 1. For instance, I have discovered that good results are secured when a so-called "Sigma" relay is used, and resistance 48 is given such value that the one speed transformer will retain control until (when the parts are approaching synchronism) positional disagreement of approximately 5 degrees is reached, when the relay will switch in the thirty-six speed transformer and will remain switched in until the parts attain synchronism. The relay is set so that when the parts are moving relatively in a direction departing from synchronism, the relay will switch in the one speed control circuit when the parts attain or exceed approximately 2 degrees of positional agreement, the differential in the switching point being provided to prevent the device from manifesting tendencies to oscillate or "hunt."

I have found that by associating with the control circuit, a timing device which is automatically placed in operation upon energization of the amplifier, and which will maintain relays 39 and 57 in the positions illustrated until the amplifier has warmed up sufficiently to assume full control, and maintaining the fixed phase of the servo motor short circuited until the amplifier has warmed up, and then first energizing the servomotor so as to bring the parts into substantial positional agreement solely under control of the 1 speed control transformer, and then depressing relays 39 and 57 so as to again place the outputs of the 1 and 36 speed control transformers under the control of relay 51, an extremely satisfactorily control mechanism is provided and in which there is no tendency for the driven member to assume an ambiguous position disposed approximately 180° from the position of the driving member. This control apparatus will now be described.

Any suitable source of alternating current of the desired frequency, indicated by the current mains 62 and 63 are connected to switches 64, and 65 respectively, which are adapted to make contact with terminals carried by lines 66 and 67. The latter are connected to the field winding 68 of a timer motor 69 which may be of any well-known type, and embodies a finger 71 which may be driven through a gear reduction or the like at any convenient speed, for instance, one revolution per minute. Primary 34 of the displacement transformer are also connected to lines 66 and 67 by suitable leads 70.

The timer motor may be of any standard make, such as for example model No. 1600 timer motor manufactured by Haydon Manufacturing Company, Forrestville, Connecticut. It merely "stalls" at the end of the full travel of member 71, and upon deenergization is returned to starting position by spring means (not shown) in well known manner.

Lines 66 and 67 also supply current to the energizing or power input terminals of the amplifier by way of leads 72 and 73 respectively. The current is fed to a rectifier supplying plate potentials for the amplifier in well-known manner. The output terminals 74 and 75 of the amplifier are connected by leads 76 and 77 to control winding 31 of servo motor 28.

From the foregoing it is apparent that upon closure of switches 64 and 65, the amplifier will be energized and timer motor 69 will be simultaneously started.

In order to prevent the fixed-phase of the servo motor from taking over prematurely, causing the motor to start and possibly drive the parts out of synchronism before the control phase has been properly placed under control of the amplifier, it is normally taken out of the circuit and short-circuited in the manner that will now be set forth.

Fixed-phase winding 29 is connected by leads 78 and 79 to a contact 82 and a switch 81 respectively, the latter being normally urged into engagement with contact 82 by means of a tension spring 83, so as to short-circuit the winding. Switch member 81 also cooperates with a contact 84 which is connected to alternating current main 63 by lead 85. A second lead 86 permanently connects the other side of coil 29 to alternating current main 62 by way of lead 78. Accordingly, when switch member 81 is disposed in the upper position shown, coil 29 is disconnected from the power supply and is short-circuited, whereas when it is in its lower position it is connected directly to the power supply.

In order to establish proper sequence of operation of switches 39, 57, and 81 by the timer motor, a rod 88 is mounted for guided vertical reciprocation in any suitable well-known manner and has its upper end disposed in the path of movement of actuator 71. Rod 88 carries a side arm 89 having a plunger 93 coacting with switch 39; a second side arm 91 having a plunger 94 coacting with switch member 57; and a third side arm 92 having a plunger 95 coacting with switch member 81. It should be particularly observed that in the deenergized condition of the parts illustrated in the drawing, plungers 93 and 94 are disposed in spaced relationship with other switches 39 and 57, whereas plunger 95 is disposed somewhat closer to its switch member 81, with the result that when actuator 71 engages the upper end of rod 88 and depresses it, plunger 95 will first actuate switch member 81, so as to connect the power motor to the line, and at a later time, upon further downward reciprocation of rod 88 under the influence of actuator 71, plungers 93 and 94 will then actuate their switch members 39 and 57. Timer motor 69 merely stalls when rod 88 has reached the end of its stroke. It is returned to starting position by spring means when switches 64 and 65 are opened, in well known manner. Rod 88 may also be returned by a spring 100 or the like.

Taking up operation of the device, and assuming that the parts are disposed in the deenergized position illustrated in the drawings, relay 51 is disposed in its lower position so as to feed the output of the 36 speed transformer into the amplifier. However since under the conditions illustrated, switch member 57 is disposed in its upper position, the 36 speed control transformer output circuit is open and switch 39 directly connects the one speed control transformer output to the input of the amplifier. It is accordingly apparent that switches 39 and 57 under the conditions illustrated, place the amplifier under the control of the 1 speed transformer irrespective of the position of relay 51. Also under the foregoing conditions, switch member 81 normally short circuits coil 29 of servo motor 28.

Assuming now that switches 64 and 65 are closed, it is apparent that the amplifier will be energized and will start to warm up, and timer motor 69 will be simultaneously started. At the end of a predetermined time interval, actuator 71 of the timer motor will depress rod 88. During the first portion of the downward travel of rod 88 its side arm 92 and plunger 95 will depress switch member 81 and connect servo motor coil 29 to main 62. While the time interval from the moment of energization of the amplifier to operation of switch 81 may be varied to suit the conditions of the particular application which is made of the invention, I have found that the amplifier will be completely warmed up at the end of 45 seconds, and therefore prefer to design the timer motor and its switch actuating train so as to operate switch 81 at the end of 45 seconds.

When switch 81 is operated by rod 88 to depress switch member 81 in the manner just described, coil 29 of the servo motor is connected to its fixed-phase of alternating current, and thereafter coil 29, and coil 31, which is now under control of the amplifier, jointly rotate the servo motor, which, through the shafting and speed reducing gearing rotates in such direction as to bring the secondary 19 of the 1 speed control transformer and driven member 2 into approximate positional agreement with the signal transmitted to its primary 11, since switch 39 maintains the amplifier under control of the 1 speed control transformer. The foregoing operation of servo motor 28 requires only a few seconds to carry out, and as it rotates the 1 speed control transformer into such position as to definitely eliminate the possibility of stopping in an ambiguous 180° null position, the device is, at the end of such operation, in condition for restoring automatic control of the amplifier input circuit by relay 51. This is automatically carried out by plungers 93 and 94 in response to further downward movement of rod 88, it being observed that plungers 93 and 94 will depress switch members 39 and 57, thereby connecting leads 41 and 46, and leads 61 and 55. While any suitable satisfactory differential between the time of operation of the switch of the servo motor, and the control transformer output switches may be employed, I have found that in the particular illustrated application of the invention a differential of two seconds is completely successful, inasmuch as this time period has proved adequate to enable the servo motor to bring the 1 speed control transformer into approximate positional agreement with the signal, no matter how far the parts might have been out of synchronism at the time of starting.

From the foregoing detailed disclosure of the invention it is apparent that a novel control apparatus is provided which will insure such operation of the servo motor as to bring the parts into substantial positional agreement under the influence of the amplifier when the latter has been energized and has warmed up sufficiently to assume control, and which, after the servo motor has brought the parts into substantial positional agreement will place the amplifier under the joint control of the 1 and 36 speed control transformers, whereby the parts are brought into final positional agreement without any possibility of them attaining an ambiguous position 180° out of positional agreement during starting conditions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed is:

1. In a position reproducing apparatus of the character in which signals proportional in magnitude to the angular departure of a rotatable output member from synchronism with respect to a rotatable input member are generated by rotatable electrical devices which are drivingly interconnected to each other and to a multi-phase power motor, a source of fixed phase current and an amplifier having a variable voltage output for energizing two phases of said power motor; switch means for automatically connecting the input side of said amplifier to the electrical circuits of one or the other of said rotatable devices, depending upon the degree of angular departure of said output member from the angular position of said input member; means for energizing said amplifier; means for normally maintaining one phase of said power motor disconnected from said source of fixed phase current; and control means, automatically operable after lapse of a predetermined length of time of energization of the plate and filament circuit of said amplifier, to connect said one phase of said power motor to said source of fixed phase current.

2. The position reproducing apparatus defined in claim 1, wherein means normally connects said amplifier to the electrical circuits of one of said rotatable electrical devices independently of said switch means at the time of initially energizing said amplifier, and said control means is also operable, after a predetermined lapse of time, to place both of said devices under control of said switch means.

3. In a position reproducing apparatus of the character having rotatable driving and driven members and in which the driven member is drivingly connected to a two-phase power motor and a rotatable control transformer, voltages being generated in said control transformer proportional to the degree of departure of the driven member from synchronism with respect to the driving member, an amplifier; means for connecting said control transformer to the input side of said amplifier; means for connecting one phase of said motor to the output side of said amplifier; a source of constant frequency current; switch means for connecting the latter to one phase of said power motor but normally maintaining the same disconnected when the plate and filament circuit of said amplifier is deenergized; means for energizing said amplifier circuit; and control means, actuated incident to energization of said amplifier circuit, for automatically connecting said other phase of said power motor to said source of constant frequency current a predetermined time subsequent to energization of said amplifier plate and filament circuit.

4. The apparatus defined in claim 3, wherein said switch means is also operable to short-circuit said other phase of said power motor when said amplifier plate and filament circuit is deenergized.

5. The apparatus defined in claim 3, wherein said control means is operable to directly actuate said switch means and connect said other phase of said power motor to said source of constant frequency current at the end of said predetermined time.

6. In a position reproducing apparatus of the character having rotatable input and output members and in which signals proportional in magnitude to the departure of said output member from synchronism with respect to said output member are generated by rotatable electrical devices which are drivingly interconnected to each other and to a multi-phase power motor, a source of fixed phase current and an amplifier having an output side for jointly energizing the said motor; switch means for automatically connecting the input side of said amplifier to one or the other of said devices, depending upon the degree of departure of said input and output members from synchronism; means for energizing the plate and filament circuit of said amplifier; switch means normally short-circuiting one phase of said power motor; and control means, actuated by said means for energizing said amplifier circuit, and being automatically operable, after lapse of a predetermined length of time, to connect said one phase of said power motor to said source of fixed phase current.

7. The position reproducing apparatus defined in claim 6, wherein means are provided for normally connecting the input side of said amplifier to one of said rotatable electrical devices independently of said switch means when said amplifier circuit is deenergized, and said control means is operable, after said one phase of said power motor has been connected to said source of fixed phase current to place said devices under control of said switch means.

8. In an electrical apparatus, a first and a second rotatable control transformer; speed reducing means drivingly interconnecting said transformers; a rotatable driving member, means for transmitting signals to said transformers in accordance with movement of said driving member; a two-phase power motor; a rotatable driven member; means for drivingly connecting said power motor to said transformers; whereby the latter develop voltages proportional to the departure of said driving and driven members from synchronism; an electronic amplifier; means for connecting one phase of said power motor to the output side of said amplifier; switch means for automatically connecting the input side of said amplifier to one or the other of said transformers, depending upon the degree of departure of said driven member from synchronism with said driving member when the apparatus is in operation; second switch means normally connecting one of said transformers to said amplifier independently of said first switch means; means for energizing the plate and filament circuit of said amplifier; and time-controlled means, automatically energized incident to energization of said amplifier plate and filament circuit, for actuating said second switch means and placing said transformer output side again under control of said first switch means at the end of a predetermined interval of time, whereby said amplifier, during its warming up period receives its input solely from said one of said transformers.

9. In an electrical apparatus, a first and a second rotatable control transformer; speed reducing means drivingly interconnecting said transformers, driving and driven members means for transmitting signals to said transformers in accordance with the movement of said driving and driven members; a two-phase power motor; means for drivingly connecting said power motor to said transformers, whereby the latter develop voltages proportional to the departure of said driving and driven members from synchronism; an electronic amplifier; means for connecting one phase of said power motor to the output side of said amplifier; switch means for automatically connecting the input side of said amplifier to one or the other of said transformers, depending upon the degree of departure of said driven member from synchronism with respect to said driving member when the apparatus is in operation; second switch means normally connecting one of said transformers to said amplifier independently of said first switch means; means for energizing the plate and filament circuit of said amplifier; time-controlled means, automatically energized incident to energization of said amplifier plate and filament circuit, for actuating said second switch means and placing said transformer output side again under control of said first switch means at the end of a predetermined interval of time, whereby said amplifier, during its warming up period receives its input solely from said one of said transformers; a source of fixed phase alternating current; third switch means normally disconnecting said power motor from said source of current; said time-controlled means being operable to actuate said third switch and connect said source of current to the other phase of said power motor at the end of another predetermined time interval.

10. In an electrical apparatus, rotatable input and output members; a first and a second rotatable control transformer; speed reducing means drivingly interconnecting said transformers, means for transmitting signals to said transformers in accordance with movement of said input and output members; a two-phase power motor; means for drivingly connecting said power motor to said transformers, whereby the latter develop voltages proportional to the departure of said input and output members from synchronism; an electronic amplifier; means for connecting one phase of said power motor to the output side of said amplifier; a source of fixed phase alternating current; switch means for connecting the other phase of said power motor to said source of current but normally disconnecting said power motor therefrom when the plate and filament circuit of said amplifier is deenergized; second switch means for automatically connecting the input side of said amplifier to one or the other of said transformers, depending upon the degree of departure of said input and output members from synchronism when the apparatus is in operation; third switch means normally connecting one of said transformers to the input side of said amplifier independently of said first switch means; means for energizing the plate and filament circuit of said amplifier; time-controlled means, automatically energized incident to energization of said amplifier circuit for actuating said first-named switch means and connecting the other phase of said power motor to said source of current at the end of a predetermined time interval, said time-controlled means also being operable to actuate said third switch means and place said transformer output again under control of said first switch means at the end of a further predetermined interval of time, whereby said amplifier, during its warming up period receives its input solely from said one of said transformers.

EMMETT P. RODEMANN.

REFERENCES CITED

The following references are of record in the file of this patent:

UNITED STATES PATENTS

| Number | Name | Date |
| --- | --- | --- |
| 1,562,917 | Richter | Nov. 24, 1925 |
| 1,985,982 | Edwards | Jan. 1, 1935 |

OTHER REFERENCES

"A Continuous-Control Servo System," by Joseph T. McNaney, "Electronics," December 1944.